(12) United States Patent
Chen

(10) Patent No.: US 8,335,631 B2
(45) Date of Patent: Dec. 18, 2012

(54) METHOD FOR ACCOMMODATING EXTRANEOUS LOADS DURING IDLE OPERATION

(75) Inventor: Jyh-Shin Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 431 days.

(21) Appl. No.: 12/759,094

(22) Filed: Apr. 13, 2010

(65) Prior Publication Data

US 2011/0247587 A1    Oct. 13, 2011

(51) Int. Cl.
*B60T 7/12* (2006.01)
(52) U.S. Cl. ......... 701/103; 701/104; 123/434; 123/680
(58) Field of Classification Search .................. 701/103, 701/104; 123/434, 680
See application file for complete search history.

(56) References Cited

U.S. PATENT DOCUMENTS

| | | | |
|---|---|---|---|
| 6,772,585 B2* | 8/2004 | Iihoshi et al. | 60/277 |
| 6,932,053 B2* | 8/2005 | Ichihara et al. | 123/344 |
| 7,004,156 B2* | 2/2006 | Lee et al. | 123/698 |
| 7,467,511 B2* | 12/2008 | Sczomak et al. | 60/277 |
| 7,562,650 B2* | 7/2009 | Tabata et al. | 123/491 |
| 7,747,379 B2* | 6/2010 | Kita | 701/105 |
| 7,933,711 B1* | 4/2011 | Ulrey et al. | 701/112 |
| 2003/0192305 A1* | 10/2003 | Iihoshi et al. | 60/277 |
| 2009/0038583 A1* | 2/2009 | Gwidt et al. | 123/299 |

OTHER PUBLICATIONS

Jun-Mo Kang, Chen-Fang Chang, Jyh-Shin Chen and Man-Feng Chang; Concept and Implementation of a Robust HCCI Engine Controller, SAE World Congress and Exhibition, Apr. 2009 p. 8, vol. 2009-01-1131, SAE International, Warrendale, PA 15096-0001—USA.

* cited by examiner

*Primary Examiner* — John Kwon

(57) ABSTRACT

Engine idle control includes commanding a preferred engine idle speed and operating the engine at a mean best torque spark timing, monitoring an engine speed and an engine air/fuel ratio, commanding an injected fuel mass corresponding to the monitored engine speed and the preferred engine idle speed, and commanding a cylinder intake air mass corresponding to the injected fuel mass, the engine air/fuel ratio and a preferred engine air/fuel ratio.

12 Claims, 3 Drawing Sheets

METHOD FOR ACCOMMODATING EXTRANEOUS LOADS DURING IDLE OPERATION

TECHNICAL FIELD

This disclosure is related to engine control during idle operation, and more particularly controlling engine speed during idle operation.

BACKGROUND

The statements in this section merely provide background information related to the present disclosure and may not constitute prior art.

Vehicle engines generate power for tractive torque and a plurality of extraneous devices such as an alternator, an A/C compressor and a power steering pump. When these extraneous devices demand power, the engine increases output power to maintain tractive power, which is noticeable when the engine is idling. Likewise, when these extraneous devices no longer demand power, the engine decreases output power. Output power provided by a vehicle engine is often controlled during idle by an electronic throttle control device with limited control authority to make minor adjustments to the intake airflow. To address this limitation, a separate idle air control valve has been used to achieve small adjustments to the intake airflow and therefore the engine idle speed and power output.

Known idle speed control systems for spark-ignition engines use spark timing to adjust engine power and maintain engine idle speed in response to changes in engine load. Spark timing can be controlled to manage engine torque and control engine speed. By advancing or retarding spark timing the engine power can be changed. Control of spark timing provides a fast acting torque control mechanism. Mean best torque (MBT) spark timing provides maximum engine torque at fixed speed, mixture composition and flow rate. An engine can be calibrated at a nominal spark timing that is retarded from the MBT spark timing, allowing the engine to rapidly adjust torque output by advancing or retarding spark timing to accommodate load transients. Thus, nominal spark timing for engine control during idle differs from MBT spark timing to allow spark timing adjustments that can either increase or decrease engine power during idle. Engine operation at the nominal, non-MBT spark timing burns fuel without a corresponding increase in engine power. Such engine operation generates a lower output torque and inefficiently consumes fuel.

SUMMARY

A method for controlling operation of a spark-ignited, direct injection engine operating lean of stoichiometry during idle includes commanding a preferred engine idle speed and operating the engine at a mean best torque spark timing, monitoring an engine speed and an engine air/fuel ratio, commanding an injected fuel mass corresponding to the monitored engine speed and the preferred engine idle speed, and commanding a cylinder intake air mass corresponding to the injected fuel mass, the engine air/fuel ratio and a preferred engine air/fuel ratio.

BRIEF DESCRIPTION OF THE DRAWINGS

One or more embodiments will now be described, by way of example, with reference to the accompanying drawings, in which.

DETAILED DESCRIPTION

Figure 1:
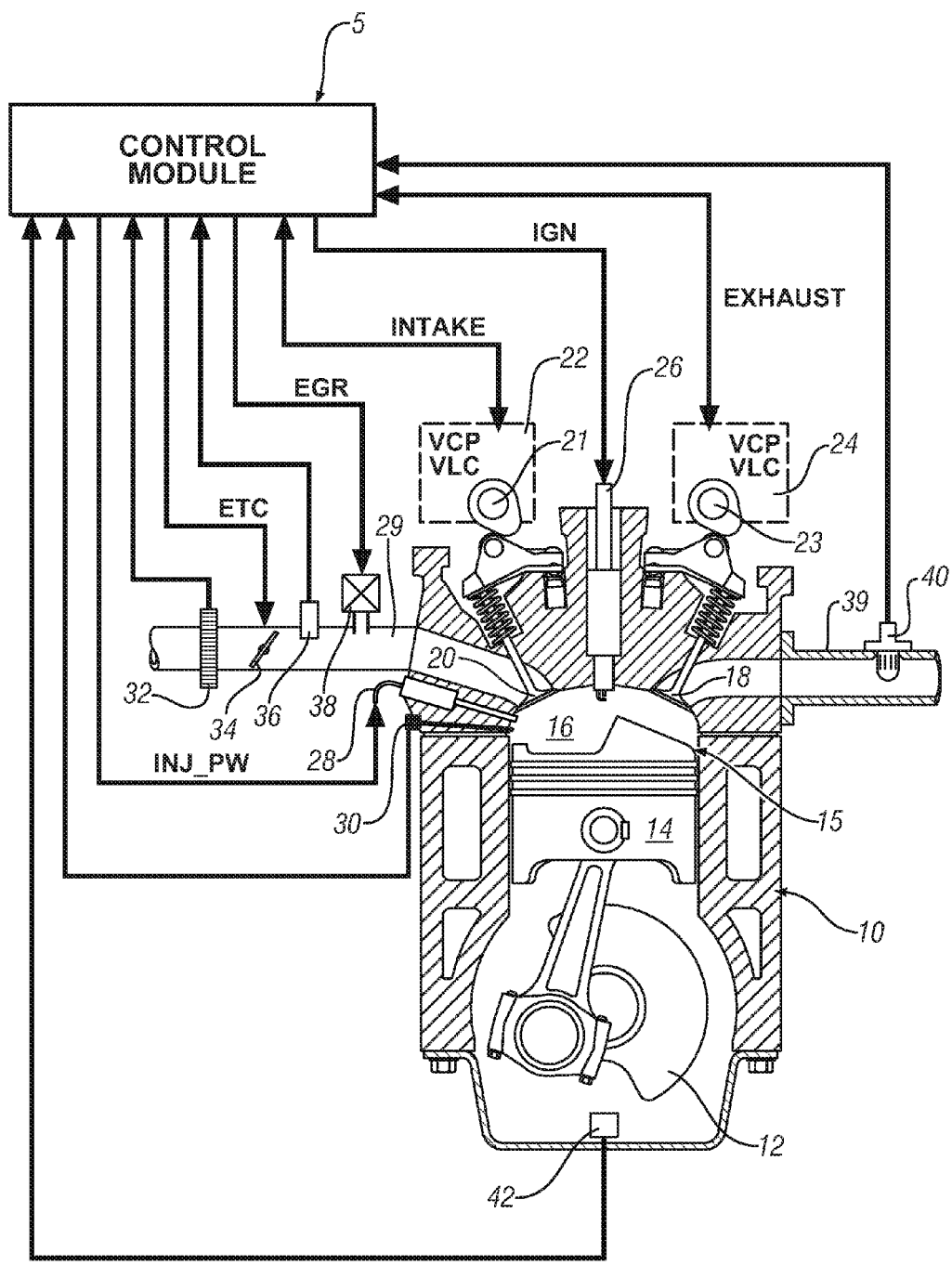
FIG. 1 is a schematic drawing of an exemplary spark-ignited, direct injection (SIDI) engine system and control system in accordance with the present disclosure.

Referring now to the drawings, wherein the depictions are for the purpose of illustrating certain exemplary embodiments only and not for the purpose of limiting the same, FIG. 1 schematically shows a spark-ignition, direct injection (SIDI) internal combustion engine 10 and an accompanying control module 5 that have been constructed in accordance with an embodiment of the disclosure. The SIDI engine 10 is selectively operative at a stoichiometric air/fuel ratio and at an air/fuel ratio that is primarily lean of stoichiometry. The disclosure can be applied to various internal combustion engine systems and combustion cycles.

In one embodiment the SIDI engine 10 can be coupled to a transmission device to transmit tractive power to a driveline of a vehicle. The transmission can include a hybrid transmission including torque machines operative to transfer tractive power to a driveline.

The exemplary SIDI engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the airflow. The air intake devices preferably include a mass airflow sensor 32 for monitoring mass airflow and intake air temperature. A throttle valve 34 preferably includes an electronically controlled device that is used to control airflow to the SIDI engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The SIDI engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably includes a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, controlled by the control module 5.

The SIDI engine 10 includes a fuel injection system including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The SIDI engine 10 includes a spark-ignition system by which spark energy can be provided to a spark plug 26 for igniting or assisting in igniting cylinder charges in each of the combustion chambers 16 in response to a signal (IGN) from the control module 5.

The SIDI engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the SIDI engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters, including those indicating engine speed, intake air temperature, coolant temperature and other ambient conditions. The control module 5 is configured to receive input signals from an operator, e.g., via an accelerator pedal and a brake pedal, to determine an operator torque request for tractive power.

The control module 5 executes algorithmic code stored therein to control the aforementioned actuators responsive to the operator torque request and the states of the engine parameters. The control module 5 controls the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include negative valve overlap (NVO) and lift of exhaust valve reopening (in an exhaust re-breathing strategy) in one embodiment. The control module 5 can operate to turn the SIDI engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in a controlled auto-ignition (HCCI) combustion modes, e.g., single and double injection controlled auto-ignition (HCCI) combustion modes, with the SIDI engine 10 controlled at a lean air/fuel ratio. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of a cylinder air charge. The intake and exhaust valves 20 and 18 are in the low-lift valve position and the intake and exhaust lift timing operate with NVO. One or more fuel injection events can be executed during an engine cycle including at least one injection during a compression phase.

During engine operation in a homogeneous spark-ignition (SI-H) combustion mode, the throttle valve 34 is controlled to regulate the air flow. The SIDI engine 10 is controlled to a stoichiometric air/fuel ratio, and the intake and exhaust valves 20, 18, respectively, are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when the fuel/air charge within the cylinder is substantially homogeneous.

In an exemplary embodiment, the SIDI engine 10 is preferably calibrated at MBT spark timing and a fuel-based approach is used to manage torque during idle operation, wherein stable engine idle speed and engine output power is controlled while accommodating intermittently occurring extraneous loads. Specifically, increasing the injected fuel mass per cylinder increases the engine torque while maintaining MBT spark timing. Therefore, increasing the injected fuel mass allows the SIDI engine 10 to generate the output torque required to accommodate extraneous loads on the SIDI engine 10 during idle operation while controlling output power and maintaining engine idle speed at a substantially stable or fixed rate of speed. Likewise, decreasing the injected fuel mass per cylinder decreases the engine torque while maintaining MBT spark timing. Therefore, decreasing the injected fuel reduces the output torque when less torque is required to accommodate extraneous loads on the SIDI engine 10 during idle operation while controlling engine output power in relation to engine load and maintaining stable engine idle speed. In a non-limiting example, an extraneous load such as an air conditioner may be turned on during idle operation. Increasing the injected fuel mass allows the SIDI engine 10 to generate additional output torque to accommodate the air conditioning while controlling output power in relation to engine load and maintaining a stable engine idle speed. Likewise, if the air conditioning system is turned off during idle operation, decreasing the injected fuel mass per cylinder will decrease the output torque while controlling output power in relation to engine load and maintaining a stable engine idle speed because the output torque needed to accommodate the air conditioning system is no longer required.

Figure 2:
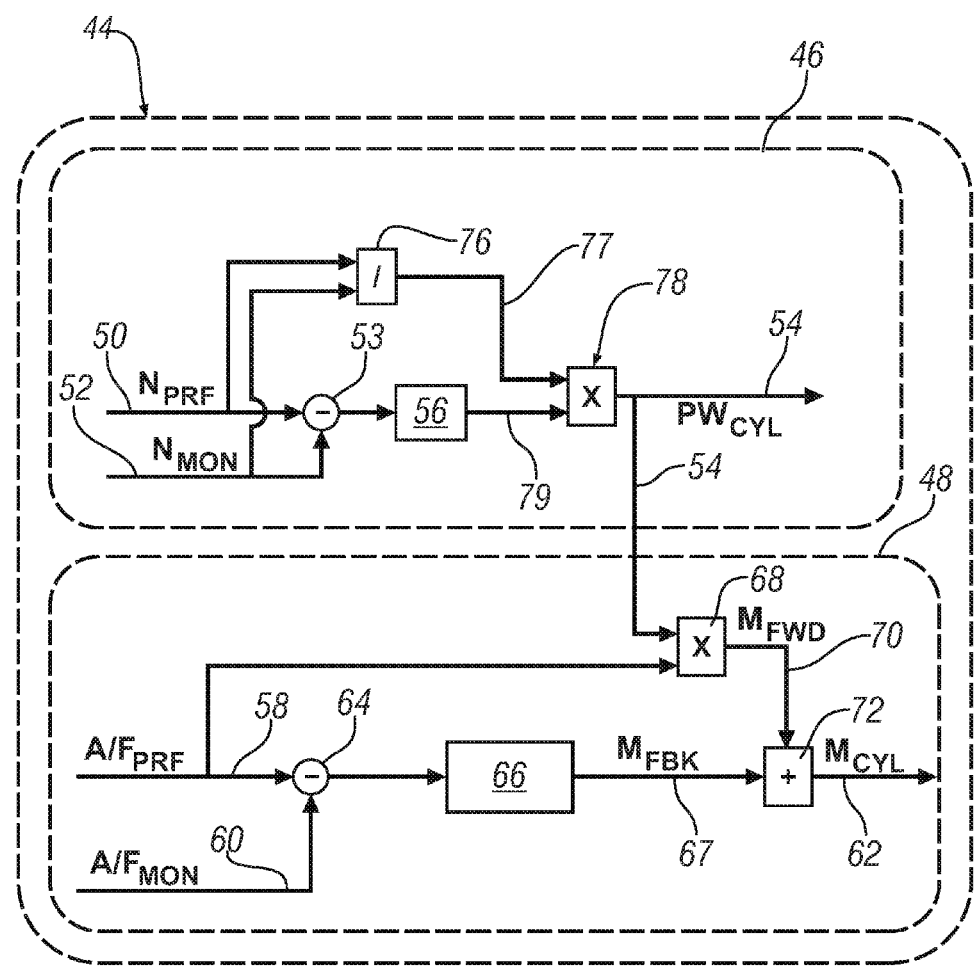
FIG. 2 is a block diagram illustrating an idle speed controller for an SIDI engine operating lean of stoichiometry including a fuel control loop and an air control loop in accordance with the present disclosure.

Referring now to FIG. 2, an exemplary embodiment of an idle speed controller 44 for operating the SIDI engine 10 at idle and lean of stoichiometry is schematically illustrated. Engine operation at idle is commanded by the control module 5 when operator input to the accelerator pedal is substantially zero. The SIDI engine 10 is controlled using the idle speed controller 44 when the accelerator pedal position is below a threshold accelerator pedal position and the rotational speed of the SIDI engine 10 is below an engine speed threshold 100 in one embodiment. The SIDI engine 10 is controlled using the idle speed controller 44 when the accelerator pedal position is below a threshold accelerator pedal position in an alternate embodiment. The threshold accelerator pedal position is preferably between 1% and 5%, which indicates that the operator input to the accelerator pedal is substantially zero, i.e. negligible.

The control module 5 executes the idle speed controller 44 when the accelerator pedal position is less than the threshold accelerator pedal position and the engine speed is below an engine speed threshold 100 in one embodiment. The idle speed controller 44 is preferably executed as algorithmic code in the control module 5 and includes a fuel control loop 46 and an air control loop 48.

The fuel control loop 46 calculates a commanded injected fuel mass per cylinder ($PW_{CYL}$) 54 that is responsive to the preferred ($N_{PRF}$) and monitored ($N_{MON}$) engine idle speeds 50, 52, respectively. The fuel control loop 46 controls engine idle speed by adjusting the injected fuel mass per cylinder $PW_{CYL}$ 54 to maintain the engine idle speed at a substantially constant level regardless of the engine load. The fuel control loop 46 includes a first portion for ratiometically comparing the preferred $N_{PRF}$ and monitored $N_{MON}$ engine idle speeds 50, 52, respectively, and a second portion for feedback control based upon the preferred $N_{PRF}$ and monitored $N_{MON}$ engine idle speeds 50, 52, respectively.

The first portion of the fuel control loop 46 includes ratiometically comparing the preferred $N_{PRF}$ and monitored $N_{MON}$ engine idle speeds 50, 52 are using divider 76 to calculate an engine speed ratio 77, i.e., $N_{PRF}/N_{MON}$.

The second portion of the fuel control loop 46 includes a difference unit 53 and an associated engine speed feedback controller 56. The difference unit 53 calculates an engine speed error, which is a difference between the preferred and monitored engine idle speeds, $N_{PRF}$ and $N_{MON}$ 50, 52, respectively. The engine speed error output from the difference unit 53 is used by the engine speed feedback controller 56 to determine a nominal injected fuel mass per cylinder 79. The preferred value for the nominal injected fuel mass per cylinder 79 is that which maintains the engine idle speed at the preferred engine idle speed $N_{PRF}$ 50. The engine speed feedback controller 56 preferably includes a PID controller having preset response times and anti-windup limits to adjust the nominal injected fuel mass per cylinder 79 in response to the difference between the preferred $N_{PRF}$ and monitored $N_{MON}$ engine idle speeds 50, 52, respectively. The nominal injected fuel mass per cylinder 79 is multiplied by the engine speed ratio 77 using multiplier 78 to calculate the commanded injected fuel mass per cylinder $PW_{CYL}$ 54. This configuration for the speed feedback controller 56 results in an immediate change in the engine fueling with a change in the engine idle speed away from the preferred engine idle speed $N_{PRF}$ 50 without any delay associated with the engine speed feedback controller 56. Specifically, when the monitored engine idle speed $N_{MON}$ 52 falls below the preferred engine idle speed $N_{PRF}$ 50, the commanded injected fuel mass per cylinder $PW_{CYL}$ 54 is increased. In a like manner, when the monitored engine idle speed $N_{MON}$ 52 increases above the preferred engine idle speed $N_{PRF}$ 50, the commanded injected fuel mass per cylinder $PW_{CYL}$ 54 is decreased. In this manner, output power from the engine 10 is adjusted by adjusting engine fueling while the engine speed is maintained at the preferred engine idle speed $N_{PRF}$ 50 regardless of engine load.

The air control loop 48 controls engine air/fuel ratio through controlling air entering the combustion chambers 16. Inputs of the air control loop 48 include preferred air/fuel ratio (A/F$_{PRF}$) 58 and monitored air/fuel ratio (A/F$_{MON}$) 60. An output of the air control loop 48 includes a cylinder air charge in the form of a commanded intake air mass per cylinder (M$_{CYL}$) 62. The air control loop 48 further includes a difference unit 64 and an air/fuel ratio feedback controller 66, wherein the difference unit 64 calculates the difference between the preferred air/fuel ratio A/F$_{PRF}$ and the monitored air/fuel ratio A/F$_{MON}$ 58, 60, respectively. The output from the difference unit 64 is input to air/fuel ratio feedback controller 66 to calculate a feedback intake air mass (M$_{FBK}$) 67.

The air control loop 48 includes a feedforward controller 68, configured to multiply the monitored air/fuel ratio A/F$_{PRF}$ 58 and the commanded injected fuel mass per cylinder PW$_{CYL}$ 54 of the fuel control loop 46 to calculate a feedforward intake air mass (M$_{FWD}$) 70. The feedforward intake air mass M$_{FWD}$ 70 and the feedback intake air mass M$_{FBK}$ 67 are combined using adding element 72 to determine the commanded intake air mass per cylinder M$_{CYL}$ 62.

Thus, the engine fueling in the form of the commanded injected fuel mass per cylinder PW$_{CYL}$ 54 is controlled based upon engine idle speed, i.e., preferred and monitored engine idle speeds 50, 52, N$_{PRF}$ and N$_{MON}$ 50, 52, respectively. The commanded intake air mass per cylinder M$_{CYL}$ 62 is determined based upon the preferred air/fuel ratio A/F$_{PRF}$ and the monitored air/fuel ratio A/F$_{MON}$ 58, 60, respectively and the cylinder air charge, i.e., the commanded injected fuel mass per cylinder PW$_{CYL}$ 54.

The SIDI engine 10 operates at lean air/fuel ratios that can range between 20:1 and 40:1 with acceptable combustion stability levels. Maintaining a precise lean air/fuel ratio has a lower priority in operation of the idle speed controller 44 because precise air/fuel ratio control is not a control priority during operation in lean combustion modes. The fuel control loop 46 of the idle speed controller 44 responds more quickly than the air control loop 48 because the air control loop 48 is limited by intake manifold dynamics.

Multiplying the engine speed error term 79 by the engine speed ratio 77 to determine the commanded injected fuel mass per cylinder PW$_{CYL}$ 54 enhances the ability to accommodate intermittently occurring extraneous loads applied to the SIDI engine 10 because engine output power is equal to the product of engine output torque and the monitored engine speed N$_{MON}$ 52, wherein engine output torque is substantially proportional to the commanded injected fuel mass per cylinder PW$_{CYL}$ 54, as indicated by Eq. 1 below:

$$\text{Power }(P) = \text{Torque} \times N_{MON} \sim K \times PW_{CYL} \times N_{MON} \quad [1]$$

Furthermore, as evidenced by the fuel control loop 46, the commanded injected fuel mass per cylinder PW$_{CYL}$ 54 is equal to the product of the output 79 and the ratio 77 between the N$_{PRF}$ and N$_{MON}$ inputs 50, 52, respectively. Thus, power remains constant for a constant output 79 regardless of the engine speed N$_{MON}$ 52.

$$P \approx K \times \text{OUTPUT} \times (N_{PRF} / N_{MON}) \times N_{MON} \quad [2]$$
$$\approx K \times \text{OUTPUT} \times N_{PRF}$$

Therefore, the fuel control loop 46 of the idle speed controller 44 controls engine output power by adjusting the commanded injected fuel mass per cylinder PW$_{CYL}$ 54. As evidenced by Eq. 1, output torque must increase as N$_{MON}$ 52 decreases to maintain the engine output power, wherein the increase in output torque is provided by increasing the commanded injected fuel mass per cylinder PW$_{CYL}$ 54. Conversely, the output torque must decrease as the N$_{MON}$ 52 increases to control engine output power, wherein the decrease in torque is provided by decreasing the commanded injected fuel mass per cylinder PW$_{CYL}$ 54. Most extraneous loads on the SIDI engine 10 are power demands in nature. The multiplier 78 automatically adjusts the commanded injected fuel mass per cylinder PW$_{CYL}$ 54 for variances in the N$_{MON}$ 52 to maintain power during idle operation. Therefore, the idle speed controller 44 will perform efficiently.

Figure 3A:
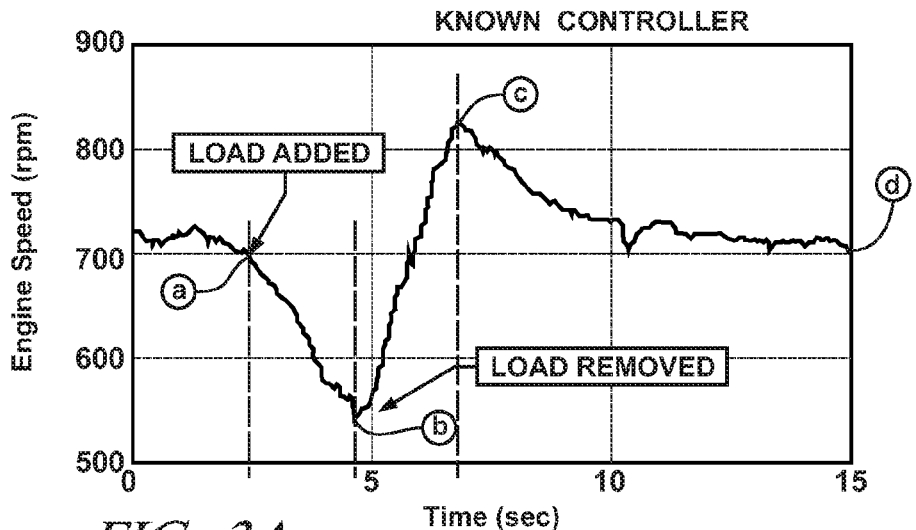
FIGS. 3A and 3B graphically illustrate engine speed response for a known idle speed controller and the idle speed controller described with reference to FIG. 2, respectively, when subjected to an extraneous load during lean operation of the SIDI engine system in accordance with the present disclosure.
Figure 3B:
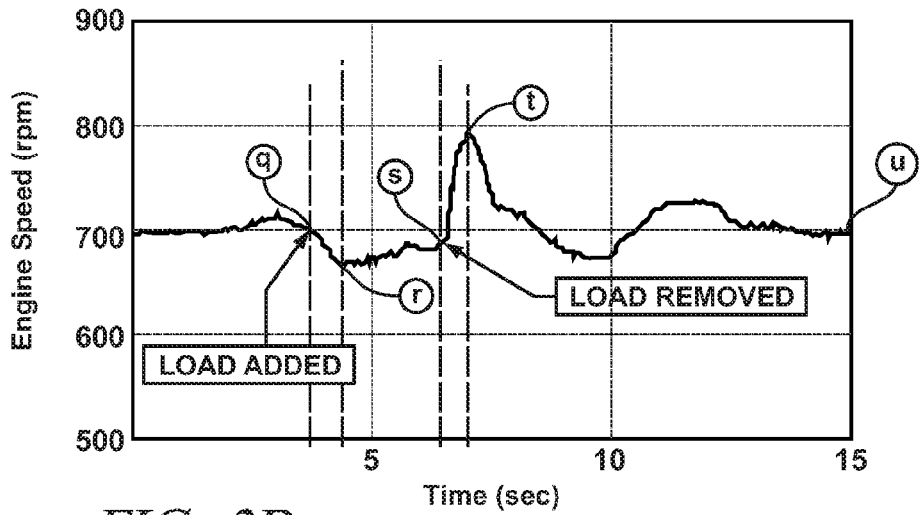

In an exemplary non-limiting example of the present disclosure, FIG. 3A illustrates engine speed response time of an exemplary SIDI engine 10 operating using a known idle speed controller, and FIG. 3B illustrates engine speed response time of the exemplary SIDI engine 10 operating using the idle speed controller 44 described with reference to FIG. 2. The exemplary SIDI engine 10 is subject to the same extraneous load during idle operation at lean air/fuel ratios. Referring to FIG. 3A, an extraneous load is applied to the SIDI engine 10 having the known idle speed controller at reference point a. At reference point a, the SIDI engine 10 is in idle operation, having a N$_{MON}$ substantially at 700 RPM and relative to the N$_{PRF}$. Subject to the extraneous load, the N$_{MON}$ decreases to substantially 540 RPM at reference point b in about 2.5 seconds. The decrease in the N$_{MON}$ is the result of additional commanded injected fuel mass per cylinder PW$_{CYL}$ required to operate the SIDI engine 10 with the applied extraneous load. At reference point b, the extraneous load is removed. When the extraneous load is removed at reference point b, the N$_{MON}$ increases from substantially 540 RPM to substantially 825 RPM at reference point c in about 2 seconds. The increase in the N$_{MON}$ due to the absence of the extraneous load is the result of less commanded injected fuel mass per cylinder PW$_{CYL}$ required to operate the SIDI engine 10 at the N$_{PRF}$ at 700 RPM. Between reference points c and d, the N$_{MON}$ begins to gradually decrease to the N$_{PRF}$ substantially at 700 RPM in about 8 seconds. As evidenced by the non-limiting exemplary example, the known idle speed controller has large N$_{MON}$ fluctuations when the extraneous load is applied or removed and the reaction time is long for the N$_{MON}$ to adjust to the N$_{PRF}$.

Referring to FIG. 3B, the extraneous load is applied to an SIDI engine 10 having the idle speed controller 44 at reference point q. At reference point q, the SIDI engine 10 is in idle operation, having a N$_{MON}$ substantially at 700 RPM and relative to the N$_{PRF}$. Subject to the extraneous load, the N$_{MON}$ decreases to substantially 675 RPM at reference point r in less than one second. The decrease in engine idle speed is the result of additional injected fuel mass per cylinder PW$_{CYL}$ required to operate the SIDI engine 10 with the applied extraneous load. Between reference points r and s, the N$_{MON}$ increases toward the N$_{PRF}$ of 700 RPM. At reference point s, the extraneous load is removed when the N$_{MON}$ is substantially at 690 RPM. Subject to the absence of the extraneous load, the N$_{MON}$ increases to substantially 790 RPM at reference point t. The increase in the N$_{MON}$ is the result of less injected fuel mass per cylinder PW$_{CYL}$ required to control engine output power in relation to engine load to operate the SIDI engine 10 without the applied extraneous load. Between reference points t and u, the N$_{MON}$ begins to oscillate at or near the N$_{PRF}$ of 700 RPM. As evidenced by the non-limiting exemplary example, the idle speed controller 44 has relatively small engine idle speed fluctuations when the extraneous load is applied or removed and the reaction time is short for the N$_{MON}$ to adjust to the N$_{PRF}$ while controlling engine output power in relation to engine load.

As shown in FIGS. 3A and 3B, when comparing the idle speed controller 44 of the present disclosure and the known idle speed controller, the known idle speed controller has large fluctuations in $N_{MON}$ when the extraneous load is applied or removed and longer reaction times for the $N_{MON}$ to approach the $N_{PRF}$. The long reactions times and large fluctuations in $N_{MON}$ in the known idle speed controller are largely due to the absence of the divider 76 and the multiplier 78 shown in FIG. 2 of the present disclosure. As shown, the idle speed controller 44 of the present disclosure allows for minimal speed fluctuations during idle operation when an extraneous load is applied to or removed from the SIDI engine 10. The speed feedback controller of the present disclosure allows for a quick response to adjust the commanded injected fuel mass per cylinder $PW_{CYL}$ to control engine power in relation to engine load and maintain stable engine idle speed when an extraneous load on the SIDI engine 10 is applied or removed.

Therefore, as evidenced by FIGS. 3A and 3B, and referring to FIG. 2, multiplying the ratio 77 and the output 79 of the speed feedback controller 56 to determine the commanded injected fuel mass per cylinder $PW_{CYL}$ 54, enhances the ability to accommodate extraneous loads applied to and removed from the SIDI engine 10. As discussed above, engine output power is substantially equal to the product of the commanded injected fuel mass per cylinder $PW_{CYL}$ and the monitored engine idle speed idle $N_{MON}$. The multiplier 78 in the speed feedback controller 56 enables engine output power to be adjusted in relation to engine load regardless of the magnitude of the monitored engine idle speed $N_{MON}$.

When the idle speed controller 44 described with reference to FIG. 2 is enabled, the SIDI engine 10 is in idle operation and the idle speed controller is disabled, the SIDI engine 10 is in normal operation. Key differences in the control structure between operating the SIDI engine 10 in normal or idle operation are related to the injected fuel mass entering each cylinder. When the SIDI engine 10 is in normal operation, the injected fuel mass is based upon the preferred and monitored air/fuel ratios and estimated cylinder air charge. When the SIDI engine 10 is in idle operation, the $PW_{CYL}$ is adjusted to control and maintain stable engine idle speed. The transitions between normal and idle operation is preferably managed to achieve engine stability and driving conditions, wherein different air/fuel ratio controllers are appropriately enabled and disabled.

Figure 4:
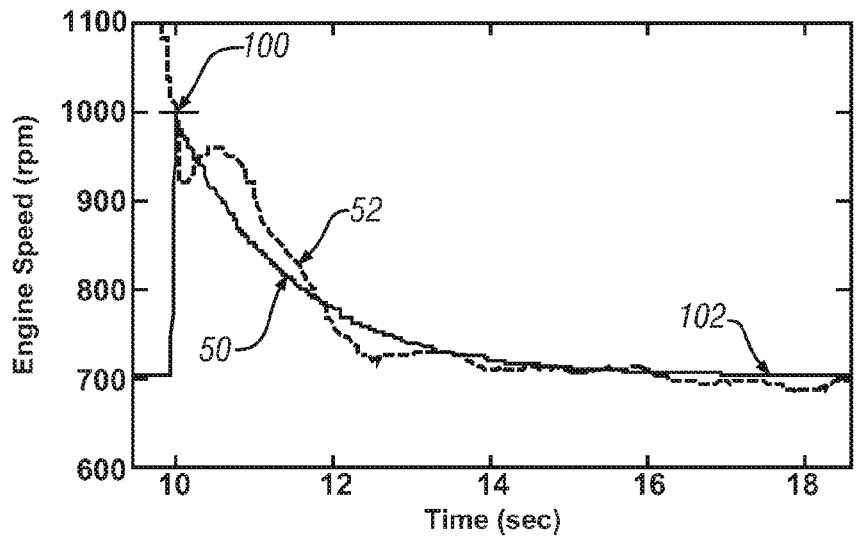
FIG. 4 is a graphical depiction of engine speed as a function of time during lean operation of the SIDI engine system illustrating the activation of the idle speed controller in accordance with the present disclosure.

Referring to FIG. 4, in accordance with an exemplary embodiment of the present disclosure, the idle speed controller 44 of FIG. 2 is enabled when the engine transitions from normal to idle operation. As previously stated, the idle speed controller 44 activates when the accelerator pedal position is below a threshold accelerator pedal position and the engine speed is below an engine speed threshold 100. The engine speed threshold 100 is chosen to be a few hundred RPM higher than the preferred engine speed $N_{PRF}$ 50. In a non-limiting example, the SIDI engine 10 is operating with a lean air/fuel ratio, the accelerator pedal position threshold is 1%, the engine speed threshold 100 is 1000 RPM and the $N_{PRF}$ 50 is 700 RPM. Once the idle speed controller is activated, the commanded injected fuel mass per cylinder $PW_{CYL}$ 54 is adjusted to control engine output power in relation to engine load and maintain stable $N_{MON}$ 52 when an extraneous load on the SIDI engine 10 is applied or removed. Once the SIDI engine 10 shifts from normal to idle operation, the transition from the engine speed threshold 100 to a steady state preferred engine speed 102 is managed by defining the $N_{PRF}$ 50 to minimize undershoot of the monitored engine speed $N_{MON}$ 52. Undershoot is understood to be any fluctuation in the monitored engine speed $N_{MON}$ 52 below the steady state preferred engine speed 102, wherein large fluctuations in the monitored engine speed $N_{MON}$ 52 are noticeable to the operator. Therefore, the idle speed trajectory for minimizing undershoot of the monitored engine speed $N_{MON}$ 52 maintains stable monitored engine speed $N_{MON}$ 52.

The idle speed controller 44 of FIG. 2 is disabled and the transition from idle to normal operation is made when the accelerator pedal is depressed greater than a second accelerator pedal position threshold and a preferred injected fuel mass per cylinder ($PW_{PRF-CYL}$), corresponding to an operator torque request indicated by the accelerator pedal position, is greater than the $PW_{CYL}$ 54 of the idle speed controller 44. Requiring the $PW_{PRF-CYL}$ to be greater than the $PW_{CYL}$ 54 prevents the $N_{MON}$ 52 from dropping immediately after transitioning from idle to normal operation for relatively low accelerator pedal positions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of a spark-ignited, direct injection engine operating lean of stoichiometry during idle, comprising:
    commanding a preferred engine idle speed and operating the engine at a mean best torque spark timing;
    monitoring an engine speed and an engine air/fuel ratio;
    commanding an injected fuel mass corresponding to the monitored engine speed and the preferred engine idle speed; and
    commanding a cylinder intake air mass corresponding to the injected fuel mass, the engine air/fuel ratio and a preferred engine air/fuel ratio.

2. The method of claim 1, wherein commanding the injected fuel mass comprises increasing the injected fuel mass to increase generated output torque in response to an increase in engine load during idle.

3. The method of claim 2, wherein commanding the cylinder intake air mass comprises increasing the cylinder intake air mass corresponding to the increased injected fuel mass, the monitored engine air/fuel ratio and the preferred engine air/fuel ratio.

4. The method of claim 1, wherein commanding the injected fuel mass comprises decreasing the injected fuel mass to decrease generated output torque and controlling the engine to the preferred engine idle speed in response to a decrease in engine load during idle.

5. The method of claim 4, wherein commanding the cylinder intake air mass comprises decreasing the cylinder intake air mass corresponding to the decreased injected fuel mass, the monitored engine air/fuel ratio and the preferred engine air/fuel ratio.

6. Method for controlling operation of a spark-ignited, direct injection engine during a transition to an idle operation, comprising:
    operating the engine at a mean best torque spark timing;
    monitoring an engine speed and an engine air/fuel ratio;
    determining a preferred engine idle speed, an idle speed trajectory and a preferred engine air/fuel ratio;
    commanding an injected fuel mass corresponding to the engine speed and the preferred engine idle speed; and adjusting an intake air mass corresponding to the injected fuel mass and the preferred and monitored engine air/fuel ratios.

7. The method of claim 6, wherein said idle speed trajectory is calibrated to minimize an undershoot of the engine speed during a transition from a monitored engine speed threshold to the preferred engine idle speed.

8. The method of claim 7, wherein said preferred engine idle speed is about 700 rpm.

9. Method for controlling engine output power in a spark-ignited direct-injection engine, comprising:
- idling the engine at an air/fuel ratio that is lean and at a mean best torque spark timing;
- monitoring an engine idle speed and the engine air/fuel ratio;
- providing a preferred engine idle speed and a preferred engine air/fuel ratio;
- adjusting an injected fuel mass in response to the monitored engine idle speed and the preferred engine idle speed; and
- adjusting an air mass in response to the injected fuel mass and the preferred and monitored engine air/fuel ratios.

10. The method of claim 9, wherein adjusting the injected fuel mass in response to the engine speed and the preferred engine idle speed comprises:
- determining an engine speed error comprising a difference between the monitored engine idle speed and the preferred engine idle speed;
- determining an engine speed ratio comprising a ratio of the preferred engine idle speed and the monitored engine idle speed; and
- multiplicatively combining the engine speed error and the engine speed ratio to determine a commanded injected fuel mass, wherein the injected fuel mass increases with a decrease in the monitored engine idle speed and decreases with an increase in the monitored engine idle speed.

11. The method of claim 9, wherein adjusting the cylinder air charge in response to the adjusted injected fuel mass and the preferred and monitored air/fuel ratios further comprises:
- determining a feedback air mass term based upon a difference between the preferred engine air/fuel ratio and the monitored engine air/fuel ratio;
- determining a feedforward air mass term based upon the commanded injected fuel mass and the preferred engine air/fuel ratio; and
- arithmetically combining the feedback air mass term and the feedforward air mass term to determine a commanded air mass.

12. The method of claim 10, wherein adjusting the cylinder air charge in response to the adjusted injected fuel mass and the preferred and monitored air/fuel ratios further comprises:
- determining a feedback air mass term based upon a difference between the preferred engine air/fuel ratio and the monitored engine air/fuel ratio;
- determining a feedforward air mass term based upon the commanded injected fuel mass and the preferred engine air/fuel ratio; and
- arithmetically combining the feedback air mass term and the feedforward air mass term to determine a commanded air mass.

* * * * *